P. H. McCAIN.
TOGGLE BOLT.
APPLICATION FILED MAR. 1, 1915.
1,167,577.
Patented Jan. 11, 1916.
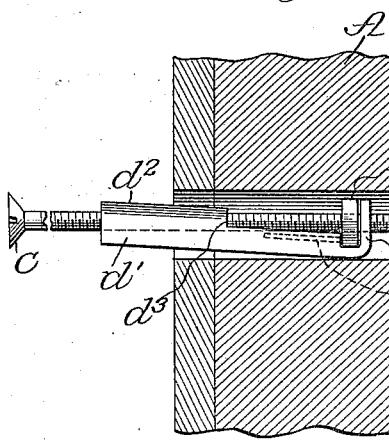
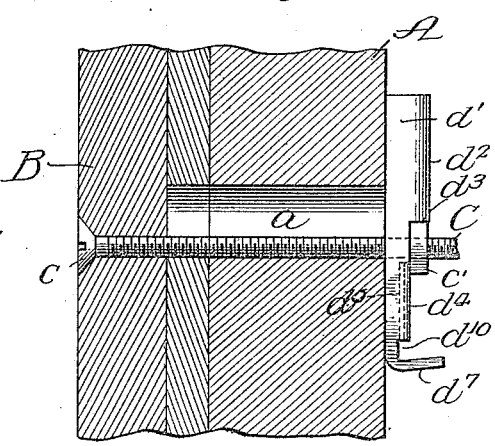
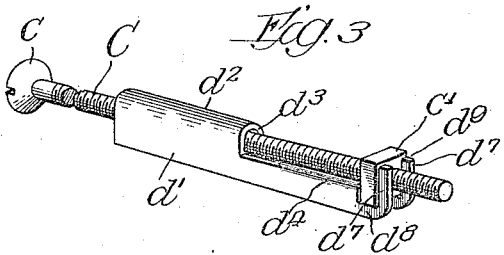
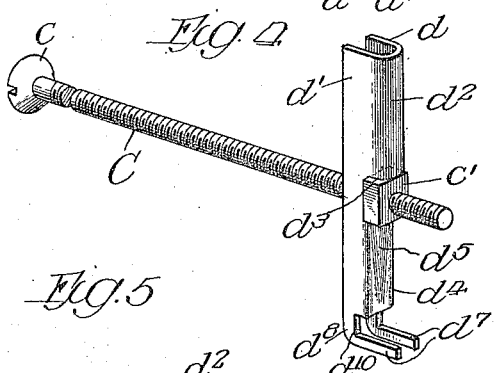
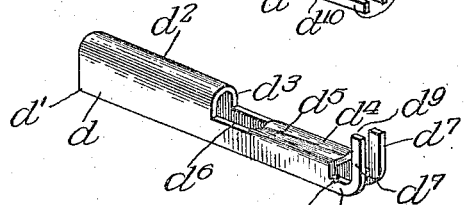
Witnesses:
Inventor
Paul H. McCain
By Peirce, Fisher & Clapp
Attys
COLUMBIA PLANOGRAPH CO., WASHINGTON, D. C.

# UNITED STATES PATENT OFFICE.

PAUL H. McCAIN, OF CHICAGO, ILLINOIS, ASSIGNOR TO PHEOLL MANUFACTURING COMPANY, OF CHICAGO, ILLINOIS, A CORPORATION.

TOGGLE-BOLT.

1,167,577.

Specification of Letters Patent.

Patented Jan. 11, 1916.

Application filed March 1, 1915. Serial No. 11,277.

*To all whom it may concern:*

Be it known that I, PAUL H. MCCAIN, a citizen of the United States, and a resident of Chicago, in the county of Cook and State of Illinois, have invented certain new and useful Improvements in Toggle-Bolts, of which I declare the following to be a full, clear, and exact description, reference being had to the accompanying drawing, forming a part of this specification.

The invention consists in the features of novelty hereinafter described, illustrated in the accompanying drawing and particularly pointed out in the claims at the end of this specification.

In the drawing, Figure 1 is a view in vertical section through a wall, my improved toggle bolt being shown in the act of being thrust through the hole in the wall. Fig. 2 is a view similar to Fig. 1 and showing the toggle bolt in anchored position. Fig. 3 is a perspective view of my improved toggle bolt with the anchor head folded against the bolt, part of the threaded bolt being broken away. Fig. 4 is a view similar to Fig. 3 with the anchor head in readiness for use. Fig. 5 is a detail perspective view of my improved anchor head.

My invention has relation to toggle bolts or anchor bolts of the type more particularly designed for securing fixtures of different kinds to walls, ceilings and the like.

Referring to the accompanying drawing, A designates a section of a wall through which is formed a hole $a$ for the passage of the toggle bolt, and in Fig. 2 there is shown a part B that is to be attached to the wall by the bolt.

C designates a threaded bolt in connection with which my improved anchor head may be used. This bolt C may be provided with an ordinary beveled head $c$, with a transverse slot to receive the end of a screwdriver, and upon the threaded portion of the bolt C is mounted a correspondingly threaded nut $c'$.

My improved anchor head is preferably formed from sheet metal stamped to the required shape and comprises side walls $d$ and $d'$ that are connected together at one end by a raised crown $d^2$ that preferably extends about midway of the anchor head and terminates in a square shouldered portion $d^3$. Adjacent their opposite ends, the side walls $d$ and $d'$ are connected together by a bridge $d^4$ that is preferably formed with a longitudinal portion $d^5$. The central portions of the side walls $d$ and $d'$ are of a height materially less than the crown $d^2$, so that the bolt C may be turned to approximately parallel relation to the anchor head when the anchor head is to be thrust through the hole in the wall or ceiling.

Between the crown $d^2$ and the bridge $d^4$ of the anchor head is formed an open space $d^6$ through which the threaded bolt C will be passed and as shown, this space $d^6$ is shorter than the diagonal dimension of the nut $c'$, so that when the bolt is in position for use, as shown in Figs. 2 and 4, the edge of the nut will be engaged and prevented from turning by the squared shoulder $d^3$ at the inner end of the crown $d^2$.

Each of the side walls $d$ and $d'$ is shown as provided with a projecting arm $d^7$ that extends longitudinally from the end of the side wall, as at $d^8$ and upwardly at right angles to the anchor head, as at $d^9$. These arms $d^7$ are arranged out of line with the bolt C when the anchor head is in the folded or collapsed position shown in Figs. 1 and 3 of the drawings, so that the arm $d^7$ will not prevent the turning of the bolt C to such position. Preferably, two projecting arms $d^7$ are employed, although obviously one arm only may be used without departing from the spirit of the invention.

Between the end of the bridge $d^4$ and the upstanding portions $d^9$ of the arms $d^7$ is formed a depressed seat or space $d^{10}$ to receive a portion of the nut $c'$ when the bolt C is turned to the position shown in Figs. 1 and 3 of the drawings. By forming the arms $d^7$ outwardly from the lower edges of the side walls $d$ and $d'$, the anchor head is afforded a longer bearing against the inner surface of the wall with which it will engage.

When the toggle bolt is to be used, the anchor head will be folded against the bolt C, as shown in Figs. 1 and 3, and as the projecting arms $d^7$ extend out of line of the threaded bolt C, they will not interfere with the turning of the bolt to the collapsed position shown, and the space or seat $d^{10}$ adjacent the projecting arm $d^7$ will receive the nut $c'$ when the bolt C is turned to bear against the bridge $d^4$. A marked advantage incident to the location of the arm or arms $d^7$ at one side of the position occupied by the bolt C when in folded position, is that these arms will engage with the nut $c'$ regardless of the position of the nut upon the bolt C. Where the anchor head is provided with a projecting arm arranged centrally at the end of the anchor head, as in prior constructions, it is necessary, in order to permit the anchor head to be folded snugly against the bolt C, to move the nut $c'$ to approximately the end of the bolt C, and when the nut is thus moved to the end of the bolt, there is danger of the nut, and consequently the anchor head, becoming disengaged from the bolt C after the anchor head has been thrust through the hole in the wall. By arranging the projecting arm that engages the nut at one side of the line of the bolt C, no care is required upon the part of the workman to adjust the nut to a position at the end of the bolt.

After the toggle bolt has been passed through the hole in the wall, the bolt will be withdrawn so as to cause the anchor head to assume the position shown in Figs. 2 and 4 of the drawings, and inasmuch as the bolt space $d^6$ is shorter than the diagonal dimension of the nut $c'$, the turning of the nut will be resisted by the shoulder $d^3$ at the inner end of the crown $d^2$.

While I have shown my improved anchor head as applied to a screw bolt having a beveled head $c$ and provided at its opposite end with a squared nut $c'$, it is obvious that if desired, an ordinary square head bolt may be used, in which case such square bolt head would be engaged by the anchor head and the retaining nut would be screwed upon the outer or free end of the bolt, in manner well understood by those familiar with this class of devices.

The precise details of construction above described may be varied without departure from the spirit of the invention, the novel features of which are hereinafter claimed.

Having thus described my invention, what I claim as new and desire to secure by Letters Patent is:—

1. An anchor head for toggle bolts formed of side walls having a raised or connecting crown at one end and a depressed bridge adjacent its opposite end, an open space being formed between said crown and bridge for the passage of the bolt, and an outwardly projecting arm at the end of said bridge, such arm being arranged at one side of the axial line of the anchor head.

2. The combination with a bolt and nut of an anchor head formed of side walls having a raised connecting crown at one end and a depressed bridge adjacent its opposite end, an open space being formed between said crown and bridge for the passage of the bolt, said open space being shorter than the diagonal width of said nut and the adjacent end of the crown being formed with a shoulder to engage said nut when the bolt is in operative position.

3. An anchor head for toggle bolts formed of side walls having a raised connecting crown at one end and a depressed bridge adjacent its opposite end, an open space being formed between said crown and bridge for the passage of the bolt, and outwardly projecting arms at a slight distance from the end of said bridge to receive the bolt between them, a depressed seat being formed between the end of the bridge and the said outwardly projecting arms to admit the edge of the bolt nut.

4. An anchor head for toggle bolts formed of side walls having a raised connecting crown at one end and a bridge adjacent its opposite end, an open space being formed between said crown and bridge for the passage of the bolt, said side walls being provided with projecting arms extending from their lower edges outwardly a slight distance and having upturned ends extending at approximately right angles to the anchor head at a slight distance from the outer end of the bridge.

PAUL H. McCAIN.

Witnesses:
 Geo. P. Fisher,
 J. G. Anderson.

Copies of this patent may be obtained for five cents each, by addressing the "Commissioner of Patents, Washington, D. C."